United States Patent [19]

Wang

[11] Patent Number: 5,379,157
[45] Date of Patent: Jan. 3, 1995

[54] COMPACT, FOLDED WIDE-ANGLE LARGE REFLECTIVE UNOBSCURED OPTICAL SYSTEM

[75] Inventor: Yaujen Wang, Arcadia, Calif.

[73] Assignee: Hughes Aircraft Company, Los Angeles, Calif.

[21] Appl. No.: 168,786

[22] Filed: Dec. 2, 1993

[51] Int. Cl.⁶ .................................. G02B 5/08
[52] U.S. Cl. ......................... 359/861; 359/868; 359/729
[58] Field of Search ............. 359/365, 366, 728, 729, 359/858, 859, 861, 868, 869

[56] References Cited

U.S. PATENT DOCUMENTS

| | | | |
|---|---|---|---|
| 2,306,679 | 12/1942 | Warmssham | 359/861 |
| 2,970,518 | 2/1961 | Ross | 359/859 |
| 3,206,603 | 9/1965 | Mauro | 359/859 |
| 3,827,059 | 7/1974 | Rambauske | 359/859 |
| 4,205,902 | 6/1980 | Shafer | 359/366 |
| 4,598,981 | 7/1986 | Hallam et al. | |
| 4,804,258 | 2/1989 | Kebo | 359/366 |
| 5,063,586 | 11/1991 | Jewell et al. | 359/859 |
| 5,071,240 | 12/1991 | Ichihara et al. | 359/859 |
| 5,173,801 | 12/1992 | Cook | 359/861 |

*Primary Examiner*—Ricky D. Shafer
*Attorney, Agent, or Firm*—Hugh P. Gortler; Michael W. Sales; W. K. Denson-Low

[57] ABSTRACT

A wide-angle optical imaging system (10) employs three mirrors (20, 22, 24) to reflect and propagate beams of electromagnetic energy (16, 17, 18) from four reflecting surfaces. A convex mirror (20) is the primary mirror/reflector. A concave mirror (22) is both the secondary and quaternary mirror/reflector for the system. A folding mirror (24) which is essentially flat mirror is the tertiary mirror/reflector for the system. The optical axis (36) of the system (10) is normal to the center of the folding mirror (24). The vertex of the convex mirror (20) and the vertex of the concave mirror (22) lie along the optical axis (36). A distortion corrector (32) and filter (34) are positioned in front of the image plane (30) of the system (10).

10 Claims, 3 Drawing Sheets

Fig_1

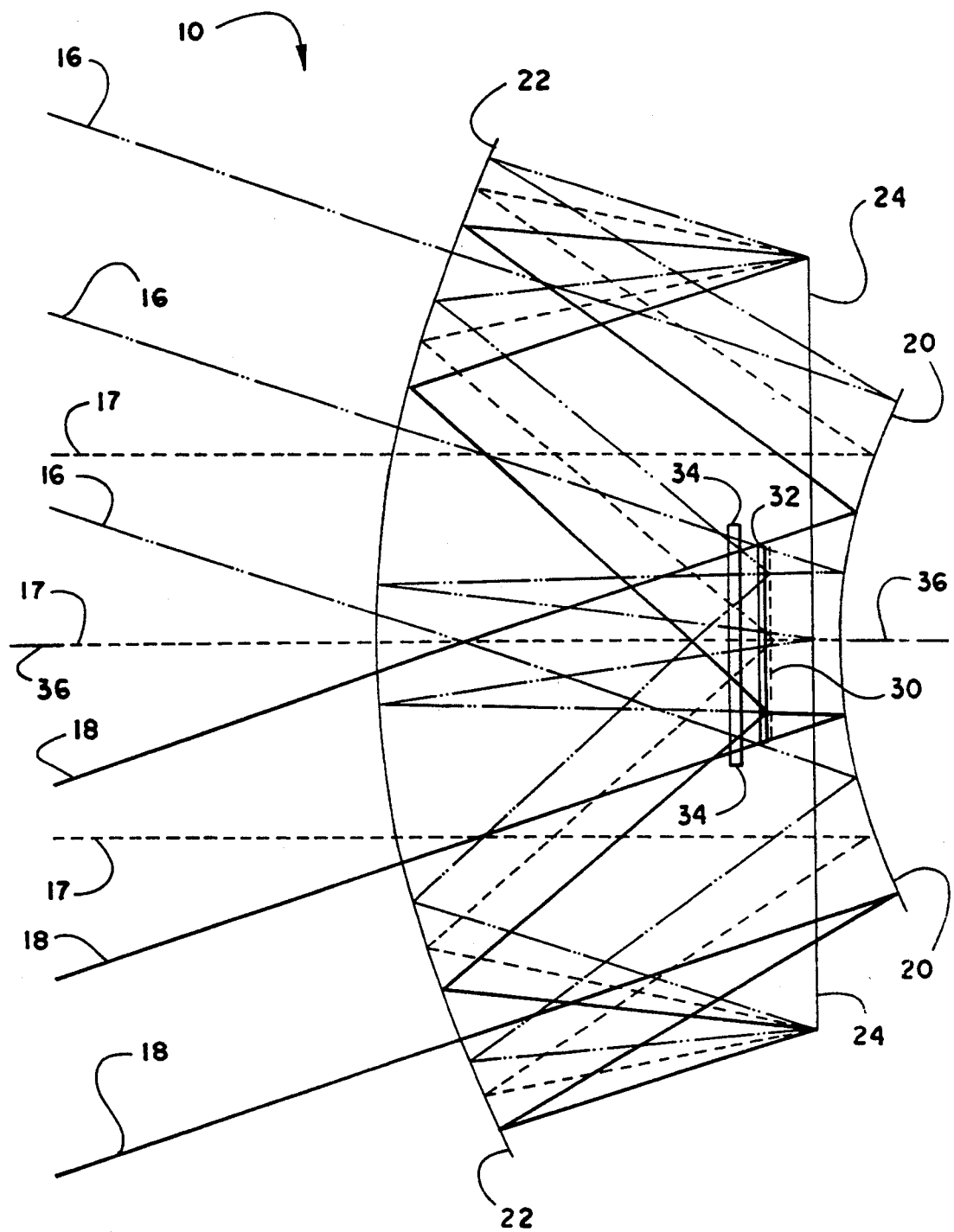
Fig_3

COMPACT, FOLDED WIDE-ANGLE LARGE REFLECTIVE UNOBSCURED OPTICAL SYSTEM

TECHNICAL FIELD OF THE INVENTION

The present invention relates to multiple-mirror optical imaging systems, and more particularly to a three-mirror optical imaging system which provides the advantages of a four-mirror system and which produces an enhanced image.

BACKGROUND OF THE INVENTION

Optical systems employing multiple mirrors to successively reflect beams of light are used to produce images of distant objects. Examples of such optical systems are telescopes and telescopic cameras. The mirrors in an optical system are typically a combination of curved and essentially flat mirrors.

A multiple-mirror optical system which works particularly well is a four-mirror system such as the four-mirror system 11 illustrated in FIG. 1. A four-mirror system is capable of producing an enhanced image because the four reflecting surfaces of such a system enable projection and formation of the image to be substantially controlled. A four-mirror system is thus more advantageous than a three- or two-mirror system. To reflect and propagate the beams 16, 17, 18 the four-mirror system 11 employs a primary mirror 12 which is a convex mirror, a secondary mirror 13 which is a concave mirror, a tertiary mirror 14 which is substantially flat, and a quaternary mirror 15 which is a concave mirror. After the beams 16, 17, 18 are reflected upon the mirrors 12, 13, 14, 15 the system produces an image of a desired object at a position of image production 19.

An objective in using a multiple-mirror optical system is to produce readily-perceivable images of distant objects from a large field of view. Often, large mirrors are used to attain a wide field of view. However, the greater the size of mirrors used, the more likely that the mirrors will obscure the beam pathway between mirrors. Thus, a problem in using multiple-mirror optical systems is that it is difficult to maintain proper alignment of the multiple mirrors so as to provide an unobscured pathway for reflected beams while also producing an image which is optimally focused. In the case of a four-mirror system 11 as illustrated, optimum imaging may be achieved but production and operation of the system is inhibited by the difficulty in maintaining an unobscured optical path when it is necessary to position four distinct mirrors. If an unobscured pathway is not maintained the ability of the optical system to produce an image will be adversely affected and the quality of the image produced will be adversely affected.

A similar problem in using multiple-mirror optical systems is that the quality of the image produced by the system is affected by the combined factors of the number, positioning and curvature of the mirrors which are necessary to enable the desired image to be produced. For example, although the four-mirror system has imaging advantages over other multiple-mirror systems, an image produced by the four-mirror system 11 is often highly distorted due to the number, positioning and curvature of the mirrors used.

SUMMARY OF THE INVENTION

It is an object of the invention to provide a wide-angle, three-mirror optical imaging system that provides the imaging capabilities of a four-mirror system.

It is a further object of the invention to provide a wide-angle, optical imaging system that produces enhanced images at a minimal cost.

In accordance with the present invention, a wide-angle optical imaging system employs three mirrors to reflect and propagate beams of electromagnetic energy from four reflecting surfaces. A convex mirror is the primary mirror/reflector. A concave mirror is both the secondary and quaternary mirror/reflector for the system. A folding mirror which is essentially a flat mirror is the tertiary mirror/reflector for the system. The optical axis of the system is normal to the center of the folding mirror. The vertex of the convex mirror and the vertex of the concave mirror lie along the optical axis. A filter and distortion corrector are positioned in front of the image plane of the system.

Other aspects, objects, features, and advantages of the present invention will become apparent to those skilled in the art upon reading the detailed description of preferred embodiments.

BRIEF DESCRIPTION OF THE DRAWINGS

FIG. 3 is a representation of an azimuthal view of the invention of FIG. 2.

DETAILED DESCRIPTION OF PREFERRED EMBODIMENTS OF THE INVENTION

Figure 1:
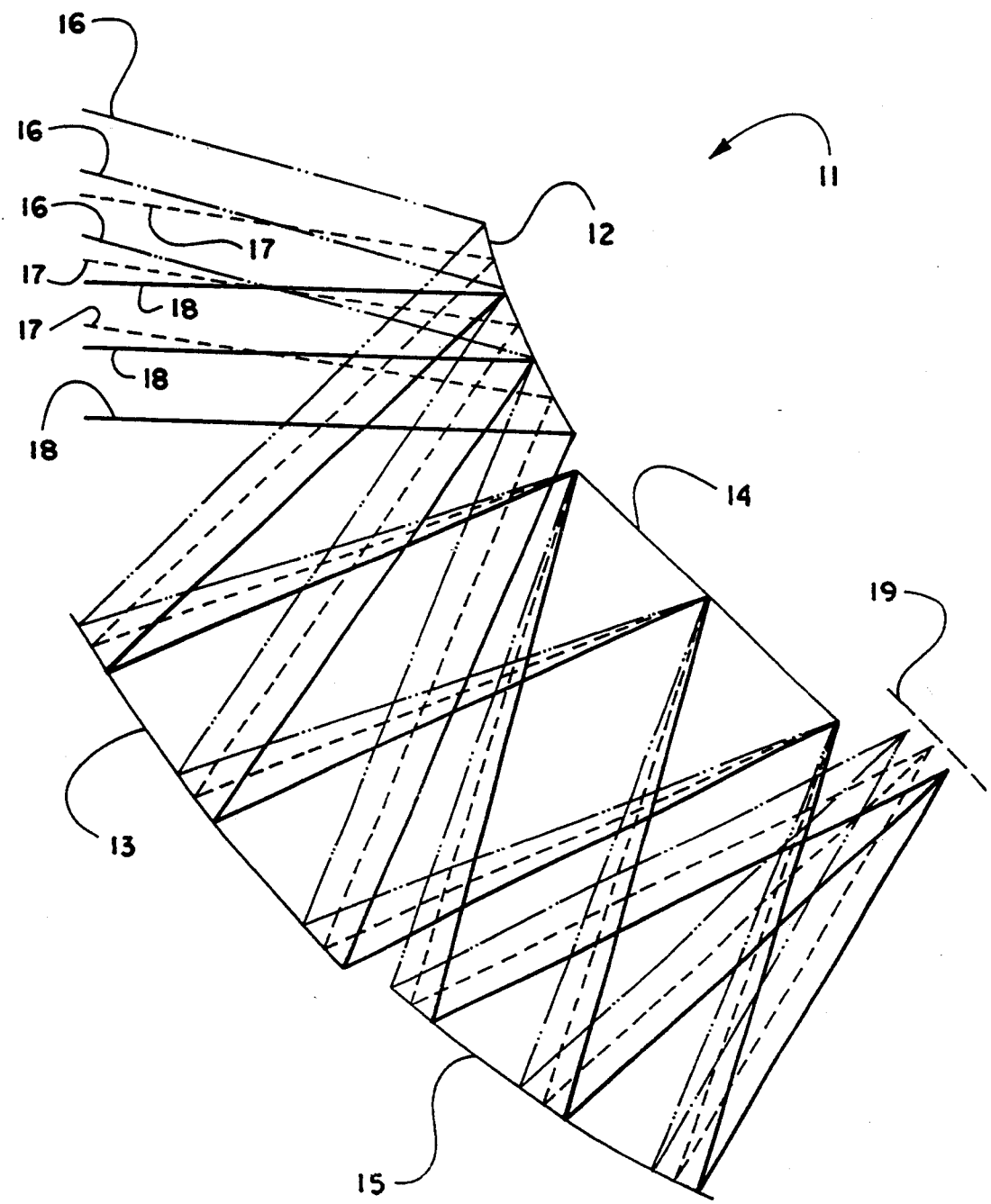
FIG. 1 is a representation of a four-mirror optical imaging system.

While the specification concludes with claims particularly pointing out and distinctly claiming the subject matter which is regarded as the present invention, the invention will now be described with reference to the following description of embodiments taken in conjunction with the accompanying drawings. Throughout the drawings, the same reference numerals are used to refer to like features of the invention.

Figure 2:
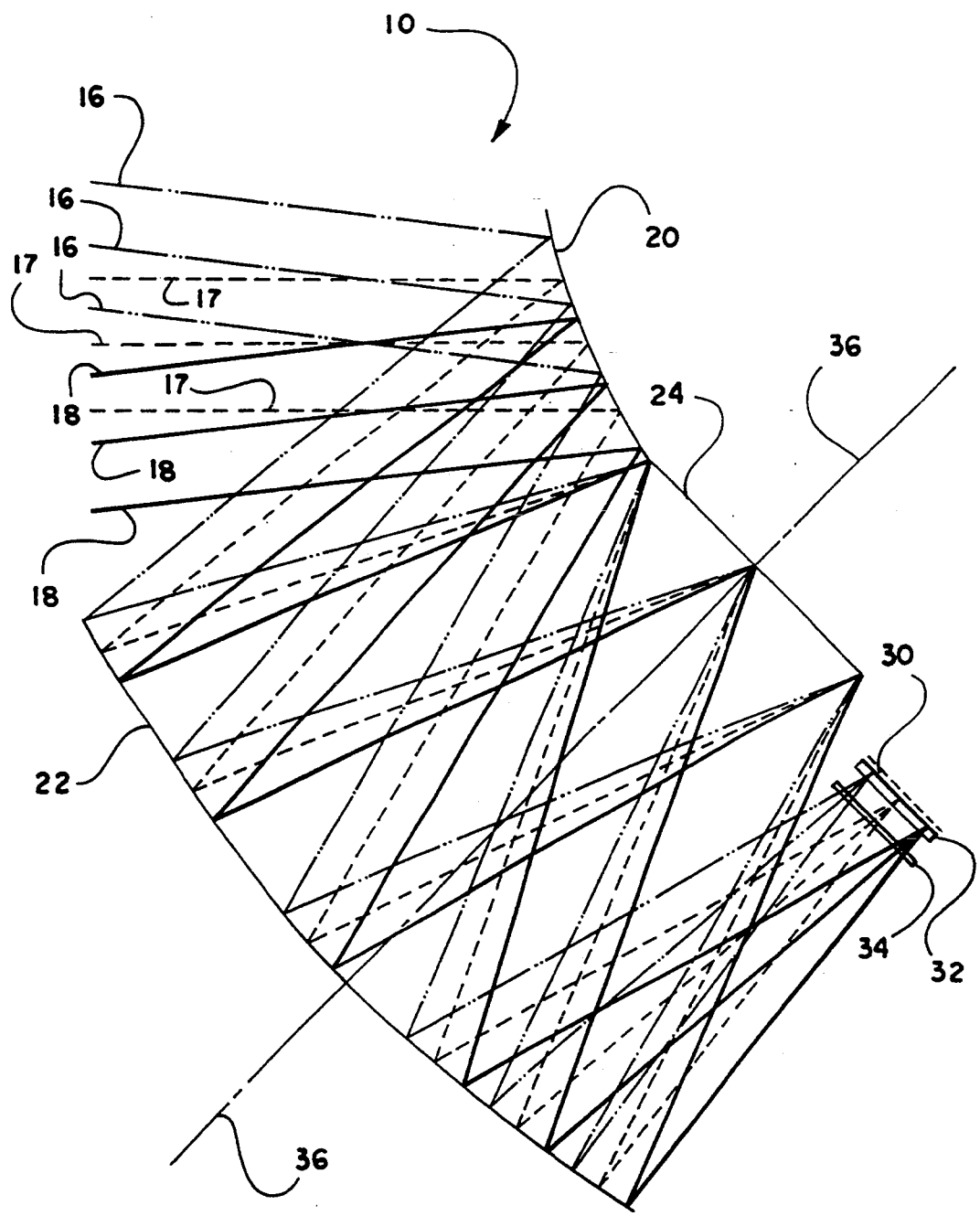
FIG. 2 is a representation of an elevational view of a three-mirror optical imaging system according to a preferred embodiment of the invention.

The invention provides an optical imaging system, consisting of three mirrors, that produces the quality of image normally only achievable with the degree of control offered by a four-mirror system. In addition, the optical system of the invention produces an image that is generally enhanced in comparison to images produced by other multiple-mirror optical systems. Referring first to FIG. 2, therein is illustrated an optical imaging system 10 according to a preferred embodiment of the invention, from an elevational view. The reflecting elements of the system 10 consist of a convex mirror 20, a concave mirror 22, and a flat, or essentially flat, mirror 24. Other elements of the system 10 include a distortion corrector 32 and, possibly, a device for modulating beams of radiation, such as a filter 34 or a chopper. The convex mirror 20 serves as the primary mirror or reflector of the system 10. Optimally, the convex mirror 20 has high-order aspheric coefficients, providing the advantage of controlling general aberrations in the system 10. The concave mirror 22 serves as both a secondary mirror/reflector for the system 10 and a quaternary mirror/reflector. One area of the concave mirror 22, a first, or uppermost, area is capable of receiving the beams 16, 17, 18 reflected from the primary mirror/reflector 20 and reflecting those beams 16, 17, 18 onward. Optimally, the concave mirror 22 is a mirror having high-order aspheric coefficients, providing the advantage of controlling general aberrations of the system 10. The tertiary mirror 24 of the system 10 is a flat, or essentially flat, mirror. The flat mirror 24 is a folding type of mirror which is pivotable with respect to the primary mirror/reflector 20. The flat mirror 24 is referred to as a folding mirror because it is generally foldable with respect to the primary mirror 20. A folding mirror provides the advantage of reducing the volume of elements necessary to construct a wide-field-of-view, all-reflecting optical system. Optimally, the flat mirror also has high-order aspheric coefficients, providing the advantage of reducing residual high-order spherical aberrations in the system. The arrangement of the elements of the system 10 about the optical axis 36 of the system 10 permits the unobscured reflection and propagation of beams 16, 17, 18 necessary for the formation of an image. The optical axis 36 is normal to the center of the flat mirror 24. The vertex of the convex mirror 20 and the vertex of the concave mirror 22 lie upon the optical axis 36. The vertex of the correcting lens 32 also lies upon the optical axis 36.

Referring now to FIG. 3, the system of FIG. 2 is further illustrated from a top, or azimuth, vantage point. The same elements described above are illustrated in FIG. 3. In particular, the manner in which the sets of beams 16, 17, 18 are reflected and ultimately converge at the image plane 30 to form an image is illustrated from a different vantage point.

Referring now simultaneously to FIG. 2 and FIG. 3, the convex mirror 20, concave mirror 22, and flat mirror 24 are positioned and aligned with respect to one another so that the path of beams 16, 17, 18 entering the system 10 is not obscured by the mirrors 20, 22, 24 as the beams 16, 17, 18 are reflected through the system 10. The primary mirror/reflector 20 receives incoming beams of electromagnetic energy 16, 17, 18 from the object whose image is to be produced by the system 10. In the illustrations of FIGS. 1, 2 and 3, each numeral 16, 17, 18 denotes beams of electromagnetic energy 16, 17, 18 entering the system 10 from a similar angular orientation with respect to the system 10. The beams 16, 17, 18 are referred to as beams of electromagnetic energy rather than beams of visible light because the system 10 is capable of forming images of objects that reflect and/or project beams of energy outside of the visible light spectrum. For example, an object may reflect or project beams of infrared electromagnetic energy that the system 10 is capable of forming into an image perceivable by infrared sensors and/or detectors placed at the image plane 30. The beams 16, 17, 18 are reflected from the convex (primary) mirror/reflector 20 to the first, or uppermost, area of the concave mirror 22 serving as the secondary reflector. From the first area of the concave mirror 22, the beams 16, 17, 18 are reflected to the flat tertiary mirror 24. From the tertiary mirror 24, the beams 16, 17, 18 are reflected to the second, or lower, area of the concave mirror 22 which serves as the quaternary mirror/reflector. The quaternary area reflects the beams 16, 17, 18 to the image plane 30, at which point the image is formed. A lens 32 serves as a corrector for optical distortion of the image which is caused by the mirrors 20, 22, 24 of the system. A filter 34, chopper or other mechanism for selectively preventing the passage of all or some frequencies of beams may be placed before the image plane 30 to further enhance perception of the image formed.

The arrangement of the convex 20 and concave 22 mirrors of the system 10 and the aberration-controlling characteristics of the mirrors in the system 10 enables images to be made of objects from a substantially wide-angled field of vision, as wide as 27 degrees horizontally and as high as 13.5 degrees vertically. The system 10 has a fast optical speed of about F/1.

As should be apparent from the foregoing specification, the invention is susceptible of being modified with various alterations and modifications which may differ from those which have been described in the preceding specification and description. Accordingly, the following claims are intended to cover all alterations and modifications which do not depart from the spirit and scope of the invention.

What is claimed is:

1. A wide-angle optical imaging system comprising:
   primary reflecting means comprising a segment of a convex mirror having high-order aspheric coefficients, positioned and adapted for receiving and reflecting beams of electromagnetic energy from a remote source;
   secondary and quaternary reflecting means comprising a segment of a concave mirror having high-order aspheric coefficients and having a first reflecting area as said secondary reflecting means and a second reflecting area adjacent said first reflecting area as said quaternary reflecting means, positioned and adapted such that the beams of electromagnetic energy reflected by said primary reflecting surface are received by said first reflecting area and said second reflecting area reflects the beams of electromagnetic energy received to an image plane whereat an image produced by the reflected beams of electromagnetic energy is perceivable; and
   tertiary reflecting means comprising a substantially flat mirror pivotable with respect to said convex mirror positioned and adapted for receiving the beams of electromagnetic energy reflected from said first reflecting area of said concave mirror and reflecting the beams of electromagnetic energy toward said second reflecting area of said concave mirror; and wherein a vertex of said convex mirror and a vertex of said concave mirror are coincident with a common optical axis which is perpendicular to a center of said substantially flat mirror.

2. The system of claim 1, wherein each said convex mirror, said concave mirror and said substantially flat mirror has high-order aspheric coefficients.

3. The system of claim 1, further comprising a lens for correcting optical distortion caused by said convex mirror, said concave mirror, and said substantially flat mirror.

4. The system of claim 1, further comprising means for modulating predetermined wavelengths of the reflected beams of electromagnetic energy.

5. The system of claim 4, said means for modulating predetermined wavelengths of the reflected beams of electromagnetic energy comprising a filter.

6. The system of claim 4, said means for modulating predetermined wavelengths of beams of electromagnetic energy comprising a chopper.

7. A wide-angle optical imaging system comprising:
   primary reflecting means comprising a segment of a convex mirror having high-order aspheric coefficients, positioned and adapted for receiving and reflecting beams of electromagnetic energy from a remote source;

secondary and quaternary reflecting means comprising a segment of a concave mirror having high-order aspheric coefficients and having a first reflecting area as said secondary reflecting means and a second reflecting area adjacent said first reflecting area as said quaternary reflecting means, positioned and adapted such that the beams of electromagnetic energy reflected by said primary reflecting surface are receivable by said first reflecting area and said second reflecting area of said concave mirror reflects the beams of electromagnetic energy received to an image plane whereat an image produced by the reflected beams of electromagnetic energy is perceivable;

tertiary reflecting means comprising a substantially flat mirror having high-order aspheric coefficients pivotable with respect to said convex mirror positioned and adapted for receiving the beams of electromagnetic energy reflected from said first reflecting area of said concave mirror and reflecting the beams of electromagnetic energy toward said second reflecting area of said concave mirror; and a lens positioned in front of said image plane adapted for correcting optical distortion caused by said convex mirror, said concave mirror, and said substantially flat mirror; and wherein a vertex of said convex mirror and a vertex of said concave mirror are coincident with a common optical axis which is perpendicular to a center of said substantially flat mirror.

8. The system of claim 7, further comprising means for modulating predetermined wavelengths of the reflected beams of electromagnetic energy.

9. The system of claim 8, said means for modulating predetermined wavelengths of the reflected beams of electromagnetic energy comprising a filter.

10. The system of claim 8, said means for modulating predetermined wavelengths of beams of electromagnetic energy comprising a chopper.

* * * * *